June 13, 1967  H. L. PENBERTHY  3,325,268
METHOD OF CHARGING AND MELTING A GLASS BATCH
Filed Dec. 11, 1962  2 Sheets-Sheet 1

INVENTOR.
HARVEY LARRY PENBERTHY
BY *Le Blanc and Shur*
ATTORNEYS.

June 13, 1967 H. L. PENBERTHY 3,325,268
METHOD OF CHARGING AND MELTING A GLASS BATCH
Filed Dec. 11, 1962 2 Sheets-Sheet 2

INVENTOR.
HARVEY LARRY PENBERTHY
BY *Le Blanc and Shur*
ATTORNEYS.

United States Patent Office 3,325,268
Patented June 13, 1967

3,325,268
METHOD OF CHARGING AND MELTING
A GLASS BATCH
Harvey Larry Penberthy, 5624 SW. Admiral Way,
Seattle, Wash. 98116
Filed Dec. 11, 1962, Ser. No. 243,959
8 Claims. (Cl. 65—134)

This invention relates to a method and apparatus for producing glass and more particularly relates to an improved method and apparatus for minimizing or eliminating inhomogeneity in the finished product due to the incorporation of unreacted silica.

In the conventional type of continuous flow tank glass furnace, unmolten batch of the desired mixture is introduced into one end of the furnace, is melted in the melting zone of the furnace, proceeds through a foam zone and a refining zone, and ultimately is directed to the working zone from which the glass is removed by any of a series of known procedures, dependent upon the ultimate product to be formed. In the tank or furnace, the alkali members of the batch begin almost immediately to fuse. There ensues reaction with the silica and the alkali silicates form eutectic liquid. Lime and other bases begin to find their complement of silica and enter solution with the alkali silicates. The excess of silica then begins to dissolve as the melt becomes hotter and viscosity lessens. Complete fusion and solution of the materials having been theoretically effected, there then remains the refining process for freeing the melt from bubbles.

In carrying out this process in conventional continuous furnaces, there is a surface inhomogeneity in the melting and refining zone in the furnace in that the composition of the surface of the glass mass varies from unmolten batch at the feed end of the furnace to theoretically completely dissolved and reacted ingredients at the point where the glass enters the working zone or chamber. This surface inhomogeneity results in a gradation in the composition of the materials at the surface of the glass mass from the feed point to the entrance to the working zone. That is to say, at the point of feed the ingredients are present in the desired percentages but in the form of unmolten batch. As the batch proceeds from the feed end toward the entrance to the working zone, the fluxes and sodium flow away faster than the silica melts and reacts thereby leaving a material high in silica floating at the surface of the glass mass. In addition, it frequently happens that there has been inadequate batch mixing thereby contributing further to surface or batch inhomogeneity. As a result of the construction and mode of heat application in conventional glass furnaces, it frequently happens that high silica material finds its way into the working zone with a resulting inhomogeneity in the resultant glass product. In top charging and bottom discharge furnaces a generally similar difficulty is encountered because of the formation of a high silica layer of glass above the molten batch.

According to the present invention it has now been found possible to substantially eliminate this product inhomogeneity through the use of a preferably all-electric continuous furnace utilizing a unique glass flow pattern which prevents high silica melt from reaching the working zone of the installation.

Specifically, the invention comprehends the use of an all-electric furnace substantially completely covered with batch blanket wherein the subsurface molten glass flow pattern into the working zone is different from the surface flow pattern of the batch blanket. According to the invention the flow of the surface batch blanket is directed in such a manner that the ultimate destination of high silica material at the surface of the glass batch is not proximate the discharge of the furnace into the working zone. With such an apparatus and arrangement, it has been found possible to substantially eliminate the incorporation into the glass in the working zone of high silica ingredients which exist at the terminal portion of the batch blanket.

It is accordingly a primary object of the present invention to provide an improved method and apparatus for manufacturing glass of a high homogeneity and freedom from seed.

It is another object of the invention to provide an improved method and apparatus for producing homogeneous glass utilizing an all-electric furnace wherein the over-all pattern of flow of the subsurface molten glass is different from the pattern of flow of the batch blanket.

It is another object of the invention to provide an improved method and apparatus for manufacturing homogeneous glass utilizing an all-electric furnace wherein the surface of the glass bath is substantially covered by batch blanket having a progressive inhomogeneity and high silica content in one area, wherein the molten glass is removed from the furnace for delivery to the working zone at a point remote from the high silica content area of the batch blanket.

It is another object of the invention to provide an improved method and apparatus for manufacturing homogeneous glass in the foregoing manner which will permit the glass withdrawal to occur at a variety of positions, including bottom withdrawal.

These and further objects and advantages of the invention will become more apparent upon reference to the following description and claims, and the appended drawings wherein:

Figure 1:
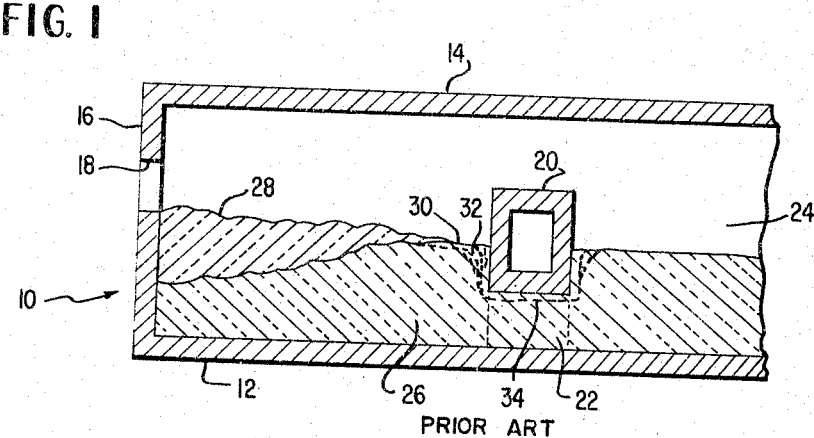
FIGURE 1 is a partial vertical cross section through a conventional fuel-fired continuous tank glass furnace showing the melting and refining portions of the furnace.

Referring to FIGURE 1 of the drawings, there is shown at 10 a conventional fuel-fired tank furnace having a floor 12, crown 14 and rear wall 16. The furnace is provided with the usual batch charging opening 18 and any conventional type of batch charger. A bridge wall 20 extends across the furnace to separate the refining from the working zone of the furnace and to provide a submerged throat 22 through which theoretically melted and refined glass enters the working zone 24.

The furnace 10 contains a molten glass bath 26 which is covered at the charging end by a batch blanket 28. As will be understood by those skilled in the art, the batch is fed into the port 18 and flows and is pushed by the introduction of more batch toward the bridge wall 20, there being a general over-all flow of both batch and molten glass in this direction. As the batch progresses toward the bridge wall 20 it progressively melts and becomes thinner in cross section until only a foam or scum remains on the surface of the glass at the point 30. This foam or scum continues on toward the bridge wall 20 and tends to accumulate at that point.

At the point of introduction of the batch into the furnace, the ingredients in the batch are present in their desired ratios and this condition prevails through most of the solid batch blanket 28. However, as the batch thins out and reaches the foam or scum covered portion of the furnace, such as the point 30, the eutectic liquids have largely flowed away, so that the unmelted ingredients at this point are high in silica. This silica high material tends to pile up at the bridge wall as shown at 32 and tends to be carried through the throat and into the working zone as shown at 34. The introduction of this high silica material into the working zone produces inhomogeneity in the finished glass product.

Figure 2:
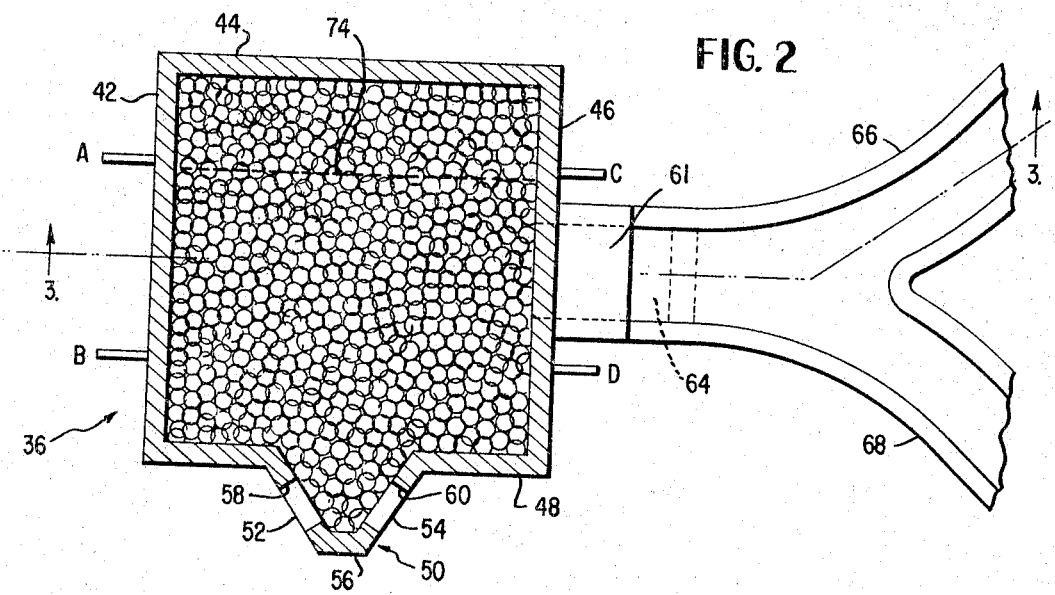
FIGURE 2 is a horizontal section of a glass furnace constructed according to one embodiment of the present invention.
Figure 3:
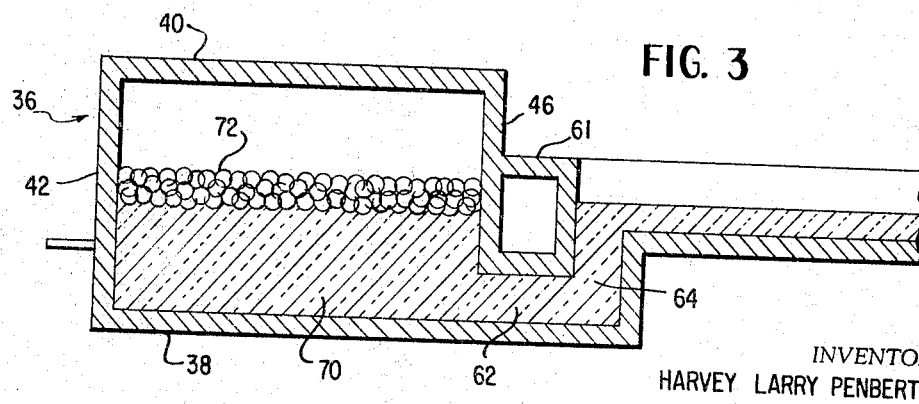
FIGURE 3 is a vertical section of the furnace of FIGURE 2 taken substantially along the line 3—3 of FIGURE 2.

Referring to FIGURES 2 and 3, there is shown one embodiment of a furnace constructed according to the invention and designed to carry out the method of the invention. In those figures there is seen an all-electric furnace generally indicated at 36 consisting of a bottom 38, crown 40 and side walls 42, 44, 46 and 48. A doghouse 50 is provided in the wall 48 and has a pair of sides 52 and 54 disposed substantially at right angles to one another and joined to an end wall 56. A pair of batch charging ports 58 and 60 are provided in the walls 52 and 54 to permit alternate charging of batch in directions 90° removed from one another.

A bridge wall 61 is disposed in the side wall 46 and defines with the bottom 38 a throat 62 which connects to a well 64. The well 64 opens into a pair of forehearths 66 and 68. A series of rod type electrodes of a refractory metal, such as molybdenum, A, B, C and D pass horizontally through the furnace walls. Electrodes A and B are connected together and to one terminal of a single phase transformer, while electrodes C and D are connected together and to the other terminal of the transformer. This particular electrode arrangement is not critical, it merely being desirable to introduce Joule effect heat into the molten batch in a generally uniform fashion.

In the operation of this furance, batch is charged alternately into one of the doghouse ports, such as port 58, and is then charged into the other doghouse port 60 until the glass bath 70 is completely covered with a batch blanket 72. This batch blanket is subject to the same type of surface inhomogeneity as previously discussed in conjunction with the conventional furnace of FIGURE 1 in that the ingredients at the wall 44 opposite to the feed end of the furnace are of high silica content, this area of high silica content being more or less symmetrically disposed at the far side of the broken line 74. The alternate charging through the ports 58 and 60, which are directed at 90° to one another, aids in the retention of symmetry in the disposition of the batch blanket and permits the high silica content area in the tank to be maintained in the general area delineated by the line 74. The batch blanket thus moves in a predetermined generally uniform pattern from the area of charging to a terminal area along wall 44, where the silica content is highest by reason of the action previously described.

With the furnace operated in this manner, the high silica surface ingredients are trapped in an area removed from the furnace throat so that there is no possibility of such ingredients passing through the throat and into the forehearths. Any surface ingredients which might be carried through the throat 62 would not be ingredients of high silica content, but rather would have substantially the correct percentages of the various ingredients substantially as they were introduced at the charger. Such materials would generally react and melt prior to the time they were removed from the forehearths and thereby avoid the introduction of high silica material into the finished glass product.

While the furnace illustrated in FIGURES 2 and 3 is shown and described as being operated with a complete batch blanket, it is also possible to operate the furnace with an incomplete batch blanket so long as the area of location of the high silica content ingredients is prevented from overlying the throat. Thus, an area of clear glass or foam could exist near the far wall 44 without resulting in the undesired inhomogeneity so long as the high silica ingredients do not immediately overly the throat 62. However, operation of the furnace with a substantially complete batch blanket is the preferred mode of operation.

Figure 4:
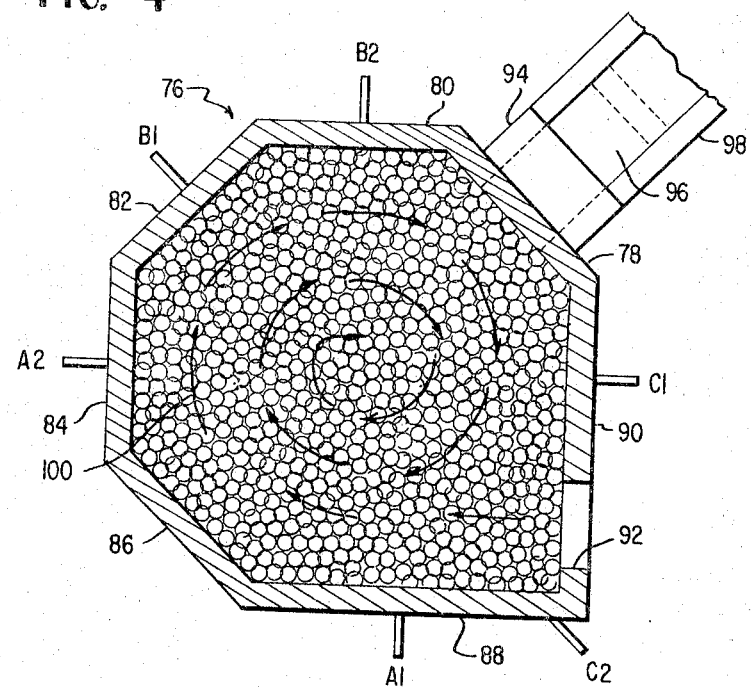
FIGURE 4 is a horizontal section of a glass furnace constructed according to another embodiment of the present invention.

While the invention has been described in terms of one specific furnace in connection with FIGURES 2 and 3, it is to be understood that various shapes, designs and sizes of furnaces may be utilized so long as the furnace permits of carrying out of the steps of the method of the invention. As an example, there is shown in FIGURE 4 a different shaped furnace 76 which is also effective in carrying out the method of the invention. The furnace 76 is generally octagonal in shape, having octagonal walls 78, 80, 82, 84 and 86. These walls are joined by generally rectangular walls 88 and 90 with a batch charging port 92 disposed in wall 90 adjacent the corner of the furnace. A bridge wall 94 is provided in the wall 78, defining a throat therein. This throat opens into a well 96 to feed a forehearth 98.

Batch of the desired constituents is charged into the port 92 and is pushed around the furnace in a generally spiral configuration as indicated by the arrows 100. With this arrangement, the silica rich surface ingredients congregate in the center of the furnace at a point remote from the throat beneath the bridge wall 94, so as to again prevent the entry of such ingredients into the forehearth 98 and thence into the ultimate product. According to this arrangement, the predetermined generally uniform flow pattern of the batch blanket is spiral with the terminal area of the batch blanket located at the center of the tank. While a complete batch blanket is shown, and actually is preferred, it is also feasible to operate a furnace of this sort with a foam covered or clear area in the center of the furnace. While the throat is shown in FIGURE 4 as being disposed in wall 78, it also is possible to dispose the throat in other walls of the furnace such as walls 80, 82 or 84.

Joule effect heat may be fed to the glass mass in the furnace of FIGURE 4 by any suitable electrode arrangement. As an example, two sets of electrodes A1, B1, C1 and A2, B2 and C2 may be respectively connected to the three terminals of the two three-phase transformers.

Figure 5:
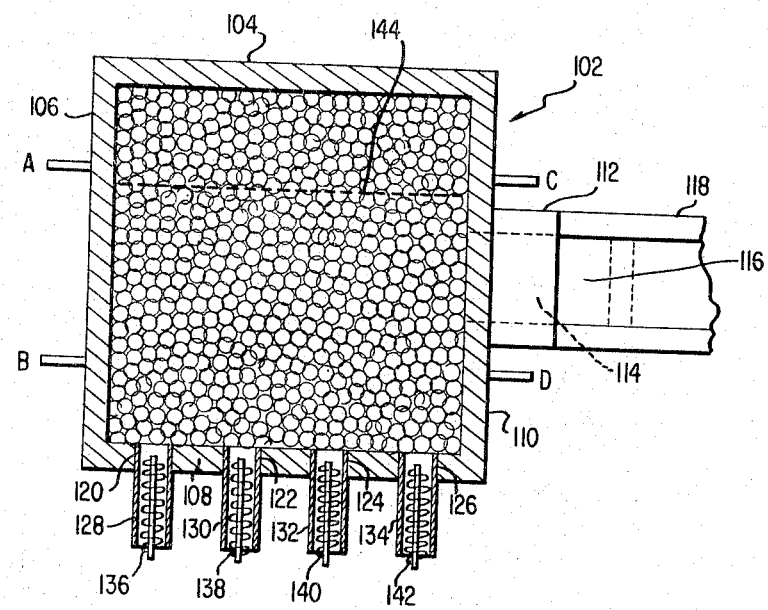
FIGURE 5 is a horizontal section of a glass furnace constructed according to a still further embodiment of the invention.

Referring to FIGURE 5, there is shown still another embodiment of the invention which is generally similar to that illustrated in FIGURES 2 and 3, but wherein the method of batch charging has been modified. According to FIGURE 5, there is shown a glass furnace 102 consisting of a tank having side walls 104, 106, 108 and 110 with a bridge wall 112 disposed along wall 110 to define a submerged throat 114. The submerged throat 114 leads to a well 116 which terminates in a forehearth 118, similar to that shown in FIGURES 2 and 3.

A series of Joule effect electrodes A, B, C, D are provided in the walls 106 and 110 of the furnace respectively. The electrodes A and B may be commonly connected to one terminal of a single phase transformer while the electrodes C and D may be commonly connected to the other terminal of the same transformer. The particular electrode disposition and transformer connections are not critical, however, and any Joule heating effect arrangement which will produce more or less uniform heat in the molten glass mass is satisfactory.

According to the embodiment of the invention illustrated in FIGURE 5, the batch is charged into the furnace by means of screw or auger type chargers. Thus, the wall 108 is provided with a series of openings 120, 122, 124 and 126, in which a series of cylindrical feed pipes 128–134 are disposed. A series of spiral propellor blades 136–142 are mounted in the pipes 128–134 and connected to suitable driving mechanisms (not shown). As will be apparent to those skilled in the art, the rotation of the blades 136–142 feeds batch from overlying hoppers into the glass furnace. With such an arrangement it is possible to maintain the distribution of the batch in a generally symmetric arrangement so that the high silica ingredients are disposed generally on the far side of the dashed line 144, the operation of this embodiment of the invention being otherwise similar to that described in conjunction with FIGURES 2 and 3.

It will be apparent from the foregoing that utilizing the apparatus and method of this invention it is possible to produce highly homogeneous glass in a variety of continuous furnaces in a quite efficient manner. While high-silica surface ingredients are created during the operation of the furnace and, indeed, no expensive attempt is made to completely eliminate the creation of such ingredients, the method and apparatus of the invention virtually eliminates the possibility of such ingredients entering the products manufactured from the glass output of the furnace.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of manufacturing glass comprising the steps of creating a molten mass of glass having a batch blanket thereover, introducing heat into said mass, charging unmolten batch to said mass to move said batch blanket away from the charging area in a predetermined generally uniform path to a terminal area, so that the batch blanket increases in silica content as it progresses along said generally uniform path away from said charging area to said terminal area, withdrawing molten glass from a submerged portion of said mass so that the subsurface molten glass flows in a predetermined generally uniform pattern different than said batch pattern, and carrying out of said withdrawal at an area removed from said terminal area and beneath a portion of said batch blanket wherein the silica content is lower than the silica content at said terminal area.

2. A method as set out in claim 1 wherein said heat is Joule-effect heat.

3. A method as set out in claim 1 wherein said batch blanket moves horizontally from said charging area to said terminal area, and wherein said withdrawal is in a substantially horizontal direction.

4. A method as set out in claim 1, wherein said method is carried out in a furnace and including the step of retaining said bath in said furnace.

5. A method as set out in claim 1 wherein said pattern of movement of said batch blanket is generally in a straight path from said charging area to said terminal area, and wherein said withdrawn glass moves away from said straight path substantially normal thereto.

6. A method as set out in claim 1 wherein said said pattern of movement of said batch blanket is substantially spiral with said terminal area being substantially at the center of the spiral, and wherein said glass is withdrawn along a path substantially radial to said spiral.

7. A method of manufacturing glass comprising the steps of creating a molten mass of glass having a batch blanket thereover, introducing heat into said mass, charging unmolten batch to said mass to move said batch blanket away from the charging area along a generally spiral path to a terminal area generally at the center of said spiral where the silica content in the batch blanket is substantially at its highest, withdrawing molten glass from a submerged portion of said mass other than beneath said terminal area.

8. A method as set out in claim 7 wherein said withdrawal of molten glass is in a direction generally radial to said spiral path.

References Cited
UNITED STATES PATENTS

| | | | |
|---|---|---|---|
| 1,596,058 | 8/1926 | Mambourg | 65—135 |
| 1,906,695 | 5/1933 | Lufkin | 65—335 |
| 2,246,375 | 6/1941 | Lyle | 65—335 |
| 2,493,260 | 1/1950 | Paquette et al. | 65—134 |

DONALL H. SYLVESTER, *Primary Examiner.*

D. CRUPAIN, G. R. MYERS, *Assistant Examiners.*